(12) United States Patent
Wei

(10) Patent No.: US 7,468,804 B2
(45) Date of Patent: Dec. 23, 2008

(54) TECHNIQUES FOR PRINTER-SIDE NETWORK CLUSTER PRINTING

(75) Inventor: Ke Wei, Cupertino, CA (US)

(73) Assignee: Ricoh Company, Ltd. (JP)

( * ) Notice: Subject to any disclaimer, the term of this patent is extended or adjusted under 35 U.S.C. 154(b) by 839 days.

(21) Appl. No.: 10/461,197

(22) Filed: Jun. 12, 2003

(65) Prior Publication Data

US 2004/0252331 A1    Dec. 16, 2004

(51) Int. Cl.
*G06F 15/00* (2006.01)
(52) U.S. Cl. .................. 358/1.15; 345/568
(58) Field of Classification Search ........... 358/1.1–1.9, 358/1.11–1.18; 710/302; 711/203; 345/568
See application file for complete search history.

(56) References Cited

U.S. PATENT DOCUMENTS

| | | | |
|---|---|---|---|
| 5,859,711 A | 1/1999 | Barry et al. | |
| 6,449,054 B1* | 9/2002 | Cox et al. | 358/1.15 |
| 6,765,686 B2* | 7/2004 | Maruoka | 358/1.15 |
| 6,928,503 B1* | 8/2005 | Mosgrove | 710/302 |
| 2003/0133146 A1* | 7/2003 | Parry | 358/1.15 |
| 2004/0190042 A1* | 9/2004 | Ferlitsch et al. | 358/1.15 |

\* cited by examiner

*Primary Examiner*—King Y Poon
*Assistant Examiner*—Lennin R Rodriguez
(74) *Attorney, Agent, or Firm*—Hickman Palermo Truong & Becker LLP

(57) ABSTRACT

Network cluster printing without external services, additional hardware or unique printer drivers is described. Cluster agents are installed on each printer of the cluster and configured to perform processes which, in one aspect, comprises receiving a print job at a master printer that is configured with a virtual network address. The virtual network address is associated with a plurality of networked printers, including the master printer. The received print job is addressed to the virtual network address, which is bound to a network interface of the master printer. The master printer determines to which printer the print job should be sent, and sends the print job to the appropriate printer according to the determination. Print jobs that are addressed to a real network address associated with a particular printer instead of the virtual network address are simply processed and printed at the particular printer.

57 Claims, 6 Drawing Sheets

```
RECEIVE, AT A MASTER PRINTER THAT IS CONFIGURED WITH
A VIRTUAL NETWORK ADDRESS THAT IS ASSOCIATED WITH A
PLURALITY OF PRINTERS, A PRINT JOB ADDRESSED TO SAID
                    VIRTUAL ADDRESS
                          402
```

```
   RECEIVE, BY SAID MASTER PRINTER AT SAID VIRTUAL
ADDRESS, A REGISTRATION OF A PARTICULAR PRINTER OF
              SAID PLURALITY OF PRINTERS
                          404
```

```
BROADCAST STATUS INFORMATION ASSOCIATED WITH SAID
 PARTICULAR PRINTER TO ONE OR MORE PRINTERS OF SAID
               PLURALITY OF PRINTERS
                        406
```

```
DETERMINE, BY SAID MASTER PRINTER, A PRINTER OF SAID
 PLURALITY OF PRINTERS TO WHICH THE PRINT JOB SHOULD
BE SENT, BASED ON STATUS INFORMATION ASSOCIATED WITH
                   THE PRINTERS
                        408
```

```
   SEND THE PRINT JOB TO THE DETERMINED PRINTER
                        410
```

TECHNIQUES FOR PRINTER-SIDE NETWORK CLUSTER PRINTING

FIELD OF THE INVENTION

The present invention relates generally to printer systems and, more specifically, to techniques for printer-side network cluster printing.

BACKGROUND OF THE INVENTION

With the widespread implementation of computer networks in office and home environments, many such networks would benefit from configurations that include multiple printers. Multiple networked printers provide redundancy, and thus, enhanced availability, as well as a more extensive offering of print services and features to the workstations connected to the network. For example, a given workstation that is connected to a network that includes multiple printers could avail itself of any of the services and features offered by any of the network-connected printers.

Known implementations of networks with multiple printers often require an external service in order for computers to locate and utilize the printers. This is especially true in instances in which the printers' network addresses are not static and may change, such as with dynamically allocated addresses. For example, LDAP (Lightweight Directory Access Protocol) may be required to locate an available network printer. For another example, RIP software may be required for processing (e.g., rasterizing) and managing print jobs to multiple computers.

One possible configuration that a network of printers may take is a cluster configuration. With a cluster of printers, a user sends a print job to the cluster and it is typically transparent to the user as to the determination of which printer or printers actually receives the job. However, known approaches to cluster printing require unique printer drivers to manage the cluster. Furthermore, such drivers are unique to particular models or brands of printers. Hence, management of multiple sets of drivers on a given workstation becomes a challenge. Therefore, such printer clusters are considered inflexible and lacking scalability.

Hence, based on the foregoing, there is a clear need for an improved technique for printing to a cluster of printers. There is a more specific need for a technique for printing to a cluster of printers which does not require external services, additional hardware or unique printer drivers.

SUMMARY OF EMBODIMENTS OF THE INVENTION

Network cluster printing without external services, additional hardware or unique printer drivers is described. In an implementation, cluster agents are installed on each printer of the cluster and configured to perform processes described herein. In one aspect, at a given instance in time, one printer acts as a master printer and the other printers act as slave printers.

In one aspect, a method for printing using a network of printers comprises receiving a print job at a master printer that is configured with a virtual network address. The virtual network address is associated with a plurality of networked printers, including the master printer. The received print job is addressed to the virtual network address, which is bound to a network interface of the master printer. The master printer determines to which printer the print job should be sent, and sends the print job to the appropriate printer according to the determination. In embodiments, the determination is based on attribute information relating to the printers, which is maintained by the master printer. Furthermore, print jobs that are addressed to a real network address associated with a particular printer instead of the virtual network address are simply processed and printed at the particular printer.

In one aspect, a method for managing a network of printers comprises transmitting, by a particular printer of the network of printers, a signal to a virtual network address. If the signal is acknowledged, that means that a printer has already assumed the role of the master. Thus, if the signal is acknowledged, then the particular printer assumes a role as a slave printer. If the signal is not acknowledged and there are no other cluster printers that are active on the network, then the particular printer assumes the role as the master printer. If the signal is not acknowledged and there are other cluster printers that are active on the network, then the particular printer negotiates with the active printers to determine which one should assume the role as the master printer. In embodiments, attribute information regarding the particular printer, acting as a slave printer, is transmitted to the master printer and is broadcast to and stored at the slave printers.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4A is a flow diagram that illustrates a method for printing using a network of printers;

DETAILED DESCRIPTION

Techniques for network cluster printing are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Operating Environment

Figure 1:
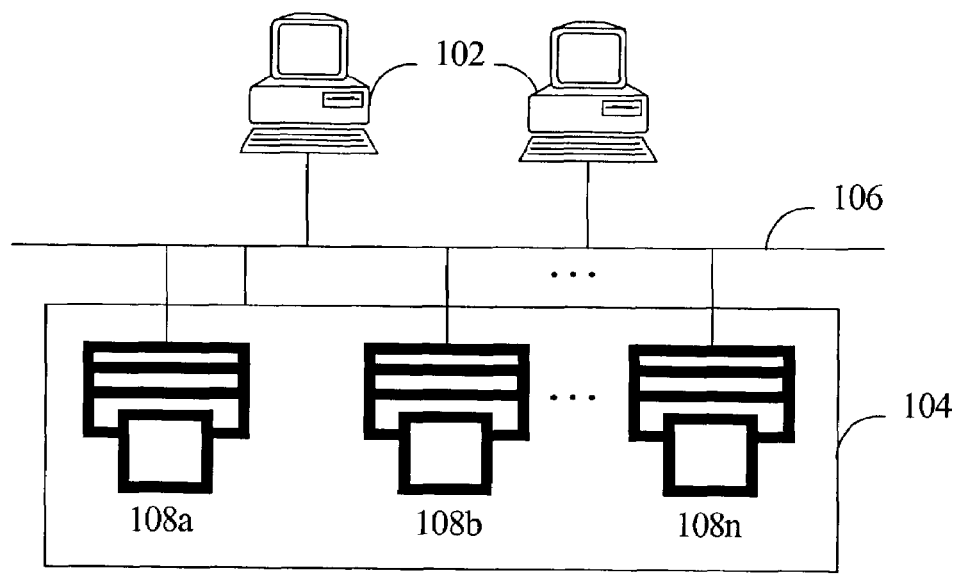
FIG. 1 is a block diagram that illustrates an example operating environment for techniques described herein.

FIG. 1 is a block diagram that illustrates an example operating environment for techniques described herein.

FIG. 1 illustrates workstations 102 communicatively coupled to a virtual printer 104 via a communication network 106. For example, workstations 102 may be conventional desktop computers and communication network 106 is a conventional LAN.

Virtual printer 104 includes a network of printers 108a, 108b, 108n (referred to herein collectively as 108a-108n). Printers 108a-108n are printers that are capable of receiving, interpreting and servicing print jobs sent from a workstation 102 through the network 106. Printers 108a-108n primarily include conventional hardware and software, with the exception of a cluster agent software application, described in detail below. Although depicted in FIG. 1 as separate printers, the plurality of printers 108a-108n that are constituent to the virtual printer 104 may comprise multiple print engines and/or mechanisms that are components of a single printing machine.

Printers 108a-108n are further capable of communicating with each other through the network 106, using one or more standard or proprietary printer communication protocols. For example, printers 108a-108n may communicate through network 106 using the Internet Protocol (IP) at the network layer of the OSI (Open System Interconnection) reference model. However, any suitable network communication protocol may be utilized, including protocols that may not yet be developed. Printers 108a-108n are configured with appropriate hardware and software so that at least two network addresses can be assigned to a physical network interface(s) of each of the printers. For example, the BSD Unix operating system, which can be run on printers 108a-108n, handles multiple network addresses.

With virtual printer 104, one of printers 108a-108n assumes the role of a master printer (108M of FIG. 2) and the other printers assume roles of slave printers (108S of FIG. 2) that are associated with the master printer. Each of printers 108a-108n has its own unique network address, referred to as the real network address, and shares a common network address, referred to as the virtual network address. For example, the real and virtual network addresses may be IP addresses if the network 106 is an IP-based network. The virtual network address is common to the printers that are configured to perform as a cluster, such as printers 108a-108n. The printers of virtual printer 104 may be configured with the virtual address by, for example, a network administrator. The real network addresses may be dynamically assigned addresses and, therefore, may change from time to time. However, the virtual network address for a given cluster remains relatively static in that they may be reconfigured for a given cluster, but it is not common to do so on a frequent basis.

Communication network 106 is any network suitable for transmitting messages via signals. For example, network 106 may be a LAN using Ethernet or other suitable technology, over which network entities communicate according to various communication protocols associated with respective layers, such as IP at the network layer.

Cluster Printer Architecture

Figure 2:
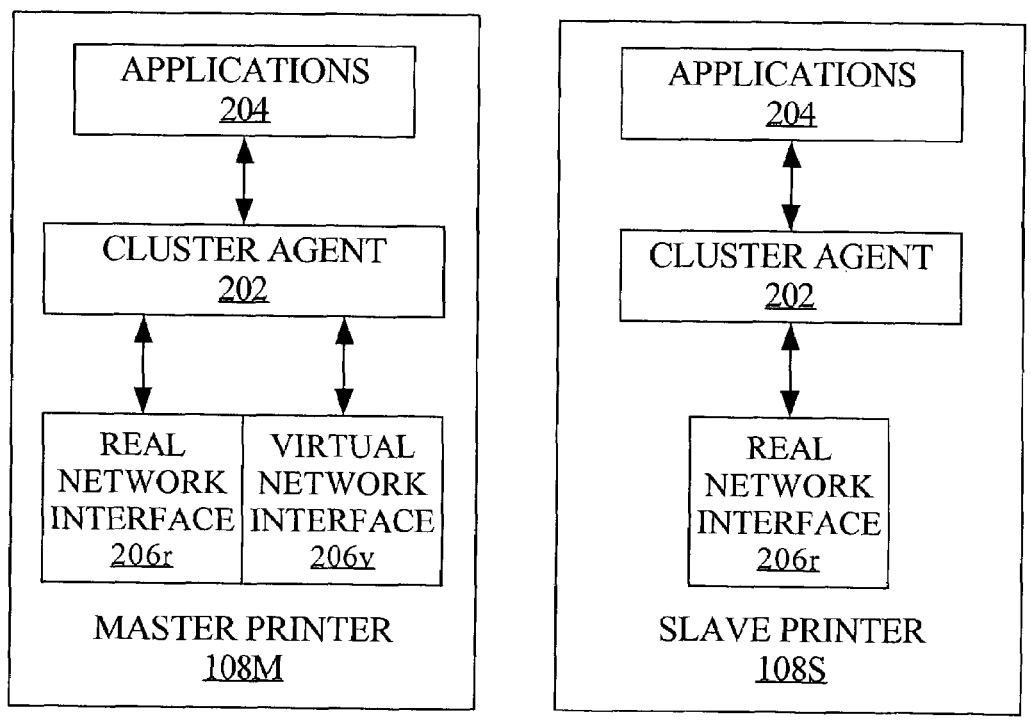
FIG. 2 is a block diagram that illustrates an architecture for network cluster printers.

FIG. 2 is a block diagram that illustrates an architecture for network cluster printers, such as printers 108a-108n (FIG. 1). FIG. 2 includes a master printer 108M and a slave printer 108S, each of which includes a cluster agent 202. Cluster agents 202 implement the cluster printing functions and the techniques described herein. Cluster agents 202 comprise software code that executes at a layer between printer applications 204 and network interfaces 206, such as real network interface 206r and virtual network interface 206v. Therefore, there is no need to modify the existing printer applications 204 to implement the techniques described herein. In an implementation, the cluster agents in the master printer 108M and in the slave printers 108S comprise the same code. Hence, any of printers 108a-108n can perform as either the master printer 108M or as a slave printer 108S.

Each slave printer 108S and the master printer 108M comprise a real network interface 206r. Real network interface 206r comprises a conventional physical network interface, such as a network interface card (NIC), which is compatible with the technology employed by the network 106 (FIG. 1). For example, if network 106 employs Ethernet technology, then real network interface 206r should support the same technology so that the printers 108a-108n can communicate with each other and with workstations 102 (FIG. 1) via the network 106. Real network interface 206r includes at least one physical port, through which communication occurs. The network interfaces 206r, 206v provide a communication coupling to a network link that is connected to communication network 106 (FIG. 1). Wireless links may be implemented. In any such implementation, network interfaces send and receive electrical, electromagnetic or optical signals that carry digital data streams representing various types of information.

When acting as the master printer 108M, a printer additionally comprises a virtual network interface 206v. In an embodiment, the real network interface 206r and the virtual network interface 206v are the same physical interface and are distinguishable with and by software. For example, the same port of a NIC can be configured to receive packets addressed to both the real network interface and the virtual network interface. However, interfaces 206r and 206v may be different physical interfaces. Furthermore, cluster agent 202 is able to discriminate between packets addressed to the real network interface 206r and packets addressed to the virtual network interface 206v, and route them accordingly.

Method for Managing a Network of Printers

Figure 3:
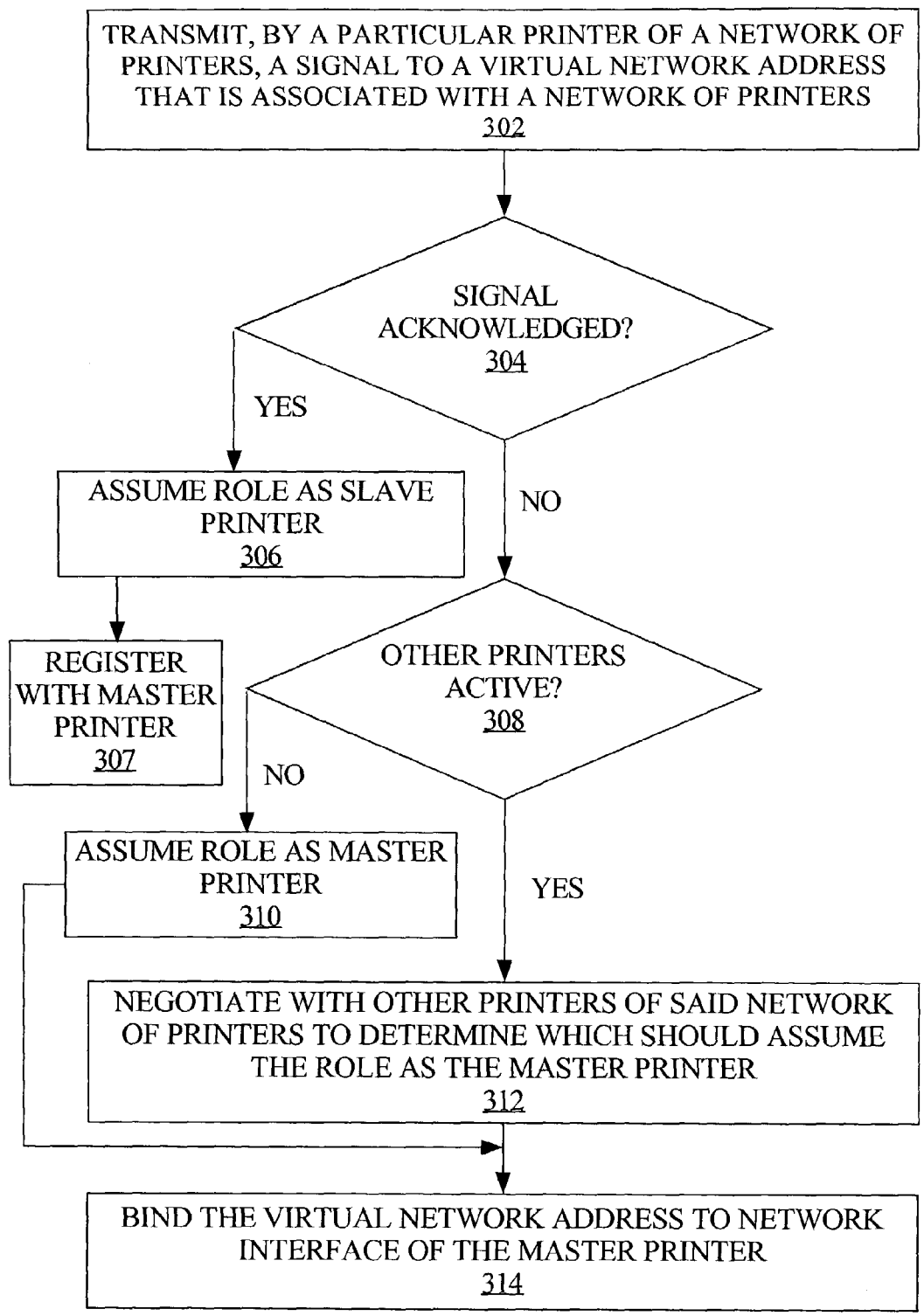
FIG. 3 is a flow diagram that illustrates a method for managing a network of printers.

FIG. 3 is a flow diagram that illustrates a method for managing a network of printers. A cluster agent 202 (FIG. 2) of a cluster printer typically performs the method of FIG. 3. The term "cluster printer" is used herein in reference to any of printers 108a-108n of virtual printer 104 (FIG. 1). The method of FIG. 3 may be performed, for example, (1) when a cluster printer comes on-line on the network; (2) when a cluster printer is assigned or otherwise obtains a new real network address; or (3) periodically, to ensure that the cluster includes a master printer for managing print jobs sent to the cluster. The method illustrated in FIG. 3 includes various embodiments of the invention. Therefore, not all the blocks need be performed in order to use the invention and the blocks need not necessarily be performed in the order in which they are described below.

At block 302, a signal is transmitted from a particular printer of the network of printers to a virtual network address that is associated with the network of printers. For example, when configuring multiple printers as a networked cluster, each printer in the cluster is configured with a common virtual network address. When a cluster printer comes on-line, changes real addresses or periodically, it sends a signal to the virtual address. Such a signal is used to determine whether any of the cluster printers has the virtual address bound to its network interface and, therefore, has assumed the role of the master printer.

At block 304, if the signal is acknowledged, then the printer assumes a role as a slave printer at block 306. If the signal is acknowledged, that means that the virtual address is already bound to the network interface of one of the cluster printers, which has assumed the role of the master printer. In an embodiment in which there is only one master printer, the printer performing the method of FIG. 3 becomes a slave printer, block 306.

In an embodiment, the printer assuming the role as a slave printer registers with the master printer, at block 307. In an embodiment, registration with the master printer includes transmitting printer attribute information to the master printer. Printer attribute information for any of the printers 108a-108n may include, for non-limiting examples, (1) the availability of the printer; (2) printing or post-printing features provided by the printer; (3) types and sizes of media available from the printer; (4) the current real network address for the printer; (5) the amount of memory available in the printer; (6) a timestamp associated with the printer's "booting up" on the network and/or registering with the master printer; and the like.

In an embodiment, the printer assuming the role of a slave printer receives a print job request that is addressed to a network address associated only with the particular slave printer and not with any of the other cluster printers. The network address to which the job is addressed is referred to as the real network address of the particular slave printer, and is different than the virtual network address. The particular slave printer then services, or prints, the print job. In summary, cluster printers assuming the role of slave printers can receive print jobs directly addressed to their respective real network addresses, or they can receive print jobs that are addressed to the virtual network address and routed to their real network address by the associated master printer. In both scenarios, the slave printers service the job in the same manner regardless of whether the job was originally addressed to a real or virtual network address.

Returning to FIG. 3, if the signal transmitted at block 302 is not acknowledged at block 304, then (1) if, at block 308, other printers are active on the network, e.g., other cluster printers are on-line on the network and have previously registered with a master printer, then the printer negotiates with the other active cluster printers to determine which of them should assume the role of master printer, at block 312. For example, the non-acknowledgement of a block 302 signal (e.g., a ping) coupled with the presence of other active printers on the network likely means that the previous master printer is down, or in some way unavailable. Hence, a different printer assumes the role of master printer for processing print jobs sent to the virtual printer 104 (FIG. 1), which are received at the virtual address. The negotiation of block 312 may consider the attribute information associated with each of the active cluster printers, which have already registered with a master printer and therefore have had their attribute information broadcast to the peer cluster printers. For example, the amount of available memory may be considered when negotiating and determining which cluster printer should assume the role of the master printer.

If the signal transmitted at block 302 is not acknowledged at block 304, then (2) if, at block 308, no other printers are active on the network, then the printer assumes the role as the master printer, at block 310. For example, the non-acknowledgement of a block 302 signal coupled with the absence of other active printers on the network may mean that the present printer is the only currently active printer on the network. Hence, the printer should assume the role of master printer so that it is available for processing print jobs sent to the virtual printer 104 (FIG. 1), which are received at the virtual address.

Regardless of which cluster printer assumes the role of master printer, according to an embodiment the virtual network address is bound to the network interface of the master printer, at block 314. Therefore, the network interface of the master printer can receive and recognize print jobs sent to the virtual address and process them accordingly, such as according to the method illustrated in FIG. 4A.

In summary, after performance of the method of FIG. 3, a cluster printer has assumed the role of the master printer 108M (FIG. 2) for the cluster of printers 108a-108n constituent to the virtual printer 104 (FIG. 1). Therefore, other cluster printers can register as slave printers with the master printer, such as according to blocks 302-307.

Method for Printing Using a Network of Printers

FIG. 4A is a flow diagram that illustrates a method for printing using a network of printers. A cluster agent 202 (FIG. 2) of a cluster printer typically performs the method of FIG. 4A. The method illustrated in FIG. 4A includes various embodiments of the invention. Therefore, not all the blocks need be performed in order to use the invention and the blocks need not necessarily be performed in the order in which they are described below.

At block 402, a print job is received at a master printer that is configured with a virtual network address. The virtual network address is associated with a plurality of printers, such as printers 108a-108n of virtual printer 104 (FIG. 1), and the print job is addressed to the virtual network address. For example, a user working at workstation 102 (FIG. 1) sends a print job to the virtual printer 104 through the network 106 (FIG. 1). Transparent to the user, a portion of the method of FIG. 4A is performed to process the print job and send it to one of the cluster printers.

Skipping to block 408, the master printer determines to which of the plurality of printers the print job should be sent. In an embodiment, the determination is based on attribute information that is associated with the cluster printers. Examples of types of attribute information that may be considered is described above in reference to block 307 of FIG. 3. In furtherance of such determination, the master printer may reference the job headers and the printer attribute information. For example, the header information contains specifications for the print job, such as type of media, number of pages, post-processing, and the like. Thus, referencing and interpreting such specifications allows the master printer to match the print job with the available printer that is most suitable for servicing the job, including itself. A user does not need to know to which printer the job is sent, in order to avail of the improved availability and expanded feature set of printer services offered by the virtual printer 104 (FIG. 1).

Then, at block 410 the master printer sends the print job to the appropriate printer for servicing. The job may be sent to a slave printer or to the master printer's own application set, such as applications 204 (FIG. 2), for processing and printing.

Blocks 404 and 406 of FIG. 4A are optional steps that may be performed by the master printer, according to embodiments. Moving back to block 404, the master printer receives at the virtual address the registration of a particular printer of the plurality of cluster printers, e.g., a slave printer. The registration of the slave printer includes registration of attribute information associated with the slave printer, as described above in reference to FIG. 3.

In an embodiment, the master printer maintains the attribute information associated with the cluster printers. In an embodiment, the master printer receives, perhaps periodically, and maintains such attribute information for each of the slave printers. The manner in which the attribute information is maintained is not important and may vary from implementation to implementation. For example, the master printer locally maintains a table of information that represents the current attributes of each of the registered slave printers. For another example, the master printer maintains in a networked database, in any form of data construct, the current attribute information for each of the registered slave printers, where it is available to each of the cluster printers.

In an embodiment, the master printer broadcasts the attribute information for the registered slave printers, as well as the attribute information regarding itself, to cluster printers, at block 406. In an implementation, the master printer broadcasts the attribute information to each of the registered slave printers. For example, the master printer transmits the attribute information to each of the real network addresses of the registered slave printers, using appropriate printer and network communication protocols. The broadcasting may occur, for example, periodically or upon registration of a new slave printer. In an embodiment, the slave printers each locally maintains a version of a attribute table or other data construct that contains the attribute information for each of the cluster printers, which was broadcast by the master printer. However, the attribute information may be maintained by the master printer at a central repository from which each cluster printer can access such information.

Figure 4B:
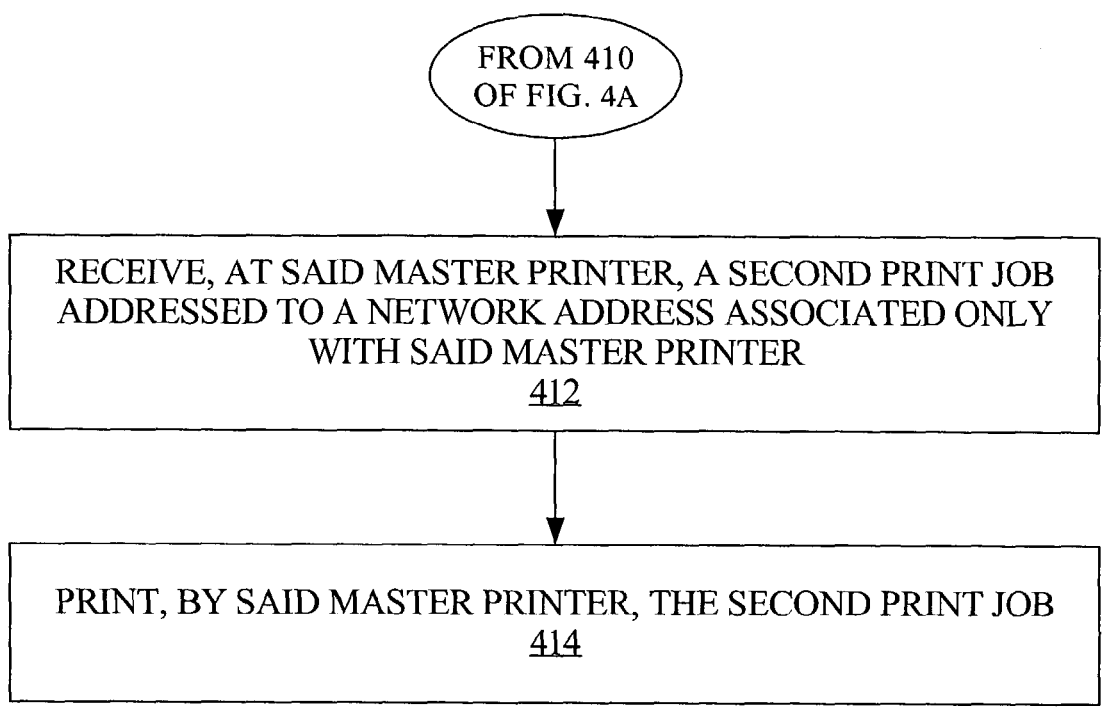
FIG. 4B is a flow diagram that illustrates a continuation of a method for printing using a network of printers as illustrated in FIG. 4A.

FIG. 4B is a flow diagram that illustrates a method for printing using a network of printers. The method represents an embodiment of the invention, with steps being performed in continuation of or independently of the method of FIG. 4A. Therefore, although blocks 412 and 414 are graphically depicted as a continuation of the method of FIG. 4A, they need not be performed in such a manner. A cluster agent 202 (FIG. 2) of a cluster printer, such as any of printers 108a-108n of virtual printer 104 of FIG. 1, typically performs the method of FIG. 4B.

At block 412, a second print job is received at the master printer. The second print job is addressed to a network address associated only with the master printer and not with any of the other cluster printers. The network address to which the second job is addressed is referred to as the real network address of the master printer and is different than the virtual network address. At block 414, the master printer services, or prints, the second print job. In summary, a master printer can receive print jobs addressed to its real network address, at block 412, whereby it will service the print job accordingly, at block 414. Further; it can receive print jobs addressed to the virtual network address, at block 402, whereby it will process the print job accordingly, at blocks 408 and 410.

Cluster Agent Architecture

Figure 5:
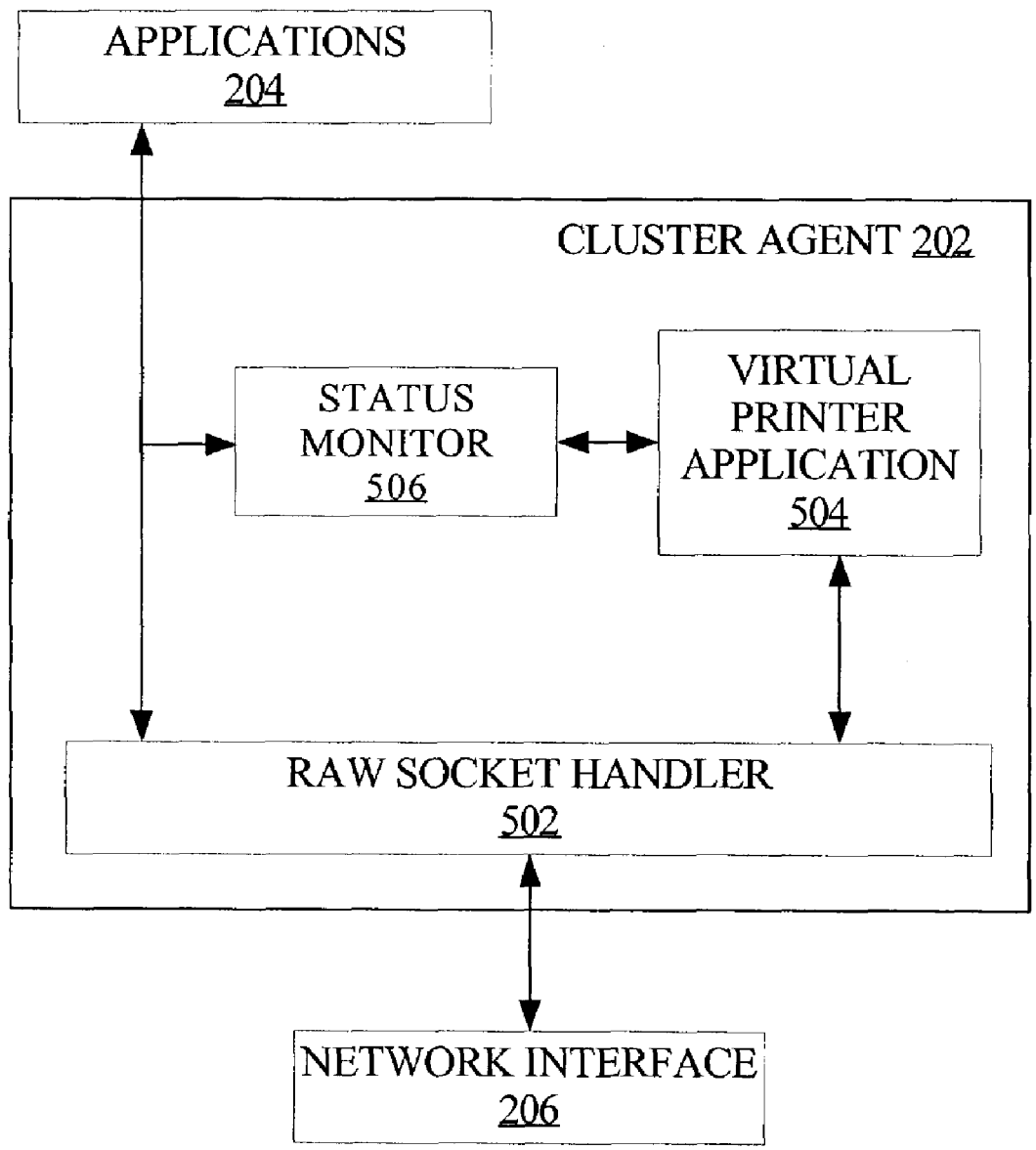
FIG. 5 is a block diagram that illustrates an example architecture for a cluster agent.

Now that processes associated with a cluster agent 202 (FIG. 2) have been described, an example architecture of a cluster agent is described. FIG. 5 is a block diagram that illustrates an example architecture for a cluster agent, according to an embodiment of the invention.

Cluster agent 202 comprises a raw socket handler 502, a virtual printer application 504 and a status monitor 506. Generally, raw socket handler 502 searches for the virtual address on the network, as in blocks 302 and 304 (FIG. 3). If it finds no such address, the printer claims to be the master, such as in blocks 308, 310 and 314 (FIG. 3). It then directs raw packets received from network interface 206 to the real printer applications 204 if their destination is the real network address of the printer, as in blocks 412 and 414 (FIG. 4B) and to the virtual printer application 504 if their destination is the virtual network address. Otherwise, if it finds the virtual address on the network, it becomes a slave printer, as in blocks 306 and 307 (FIG. 3) and occasionally checks whether the master printer is still active and available, as in blocks 302 and 304 (FIG. 3). As a slave printer, raw socket handler 502 receives print jobs originally addressed to the virtual network address which are forwarded to its real network address from the virtual printer application 504 of the master printer.

Status monitor 506 maintains the status and attributes of each cluster printer, such as attribute information received as part of a registration, as in block 404 (FIG. 4A). In addition, as a master printer, status monitor 506 works with virtual printer application 504 and the raw socket handler 502, in conjunction with the network interface 206, to broadcast attribute information to the cluster printers, as in block 406 (FIG. 4A).

As a master printer, virtual printer application 504 receives the print jobs addressed to the virtual network address of the virtual printer 104 (FIG. 1) and make decisions as to which cluster printer is most suitable for a given print job, as in blocks 402 and 408 (FIG. 4A). In addition, virtual printer application 504 works with the raw socket handler 502, in conjunction with network interface 206, to direct the print jobs to the suitable printer, as in block 410 (FIG. 4A).

In certain scenarios, virtual printer application 504 negotiates a new master printer, as in blocks 308 and 312 (FIG. 3). Furthermore, as a master printer, virtual printer application 504 binds the virtual network address to the printer's network interface 206, as in block 314 (FIG. 3).

Hardware Overview

Figure 6:
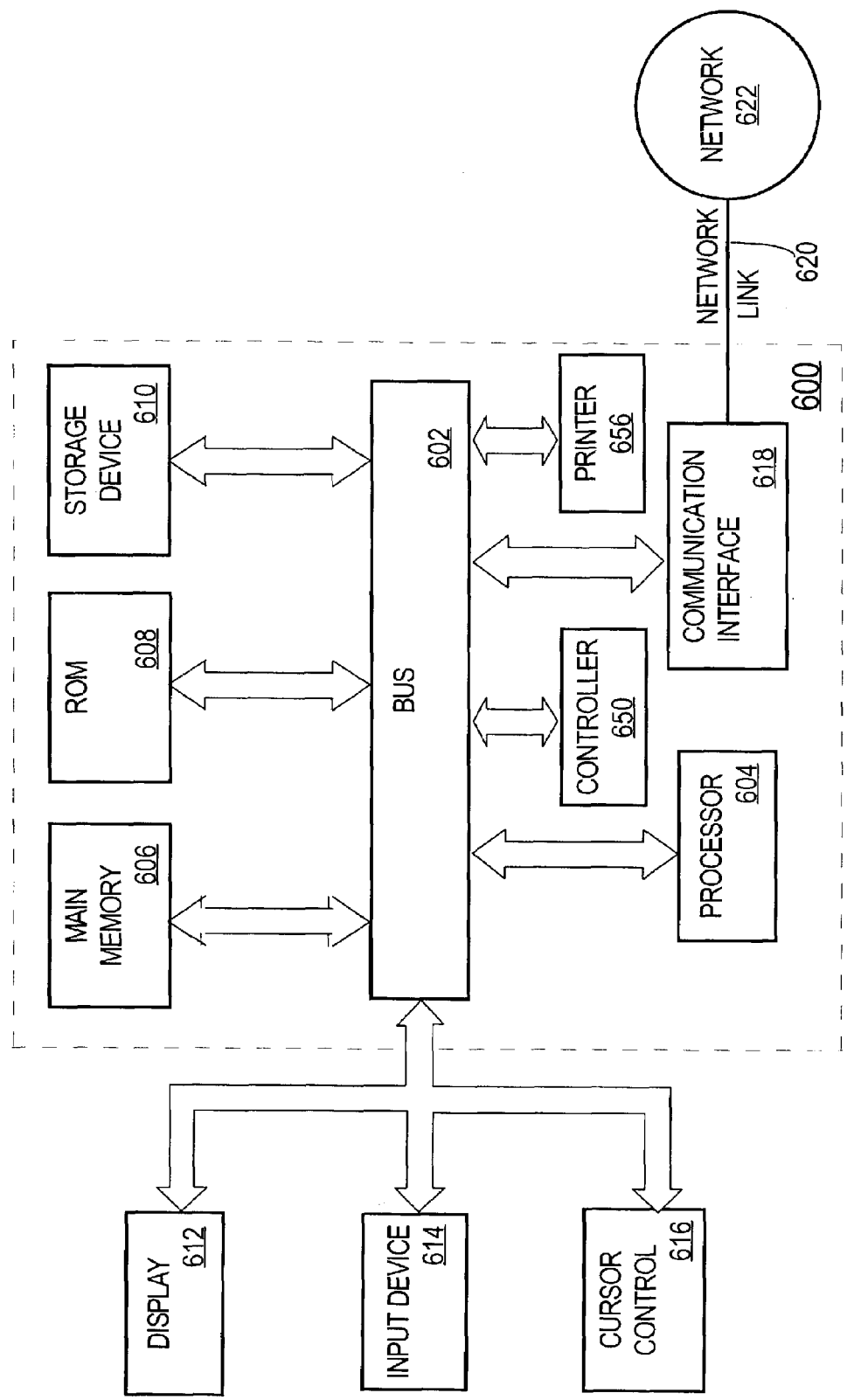
FIG. 6 is a block diagram that illustrates a system upon which an embodiment of the invention may be implemented.

FIG. 6 is a block diagram that illustrates a system 600 upon which an embodiment of the invention may be implemented. System 600 represents a generalized computing system and, therefore, implementations of the techniques described herein may vary from system 600. Hence, some components illustrated in system 600 may be eliminated, or others added, in implementations of these techniques. In one aspect, embodiments are implemented using one or more sequences of instructions executing on a printer machine. Thus, in this embodiment, system 600 is a printer machine.

System 600 includes a bus 602 or other communication mechanism for communicating information, and a processor 604 coupled with bus 602 for processing information. System 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. System 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

System 600 may be coupled via bus 602 to a display 612, such as a cathode ray tube (CRT), for displaying information to a user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of system 600 for managing a network of printers and for printing using a network of printers. According to one embodiment of the invention, the techniques described herein are provided by system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. One or more processors in a multi-processing arrangement may also be employed to execute the sequences of instructions contained in main memory 606. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to system 600 can receive the data on the telephone line and use an infrared transmitter to convert the data to an infrared signal. An infrared detector coupled to bus 602 can receive the data carried in the infrared signal and place the data on bus 602. Bus 602 carries the data to main memory 606, from which processor 604 retrieves and executes the instructions. The instructions received by main memory 606 may optionally be stored on storage device 610 either before or after execution by processor 604.

System 600 also includes a communication interface 618 coupled to bus 602. Communication interface 618 provides a two-way data communication coupling to a network link 620 that is connected to a network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through network 622 to another printer device. Network 622 uses electrical, electromagnetic or optical signals that carry digital data streams. The signals through the various networks and the signals on network link 620 and through communication interface 618, which carry the digital data to and from system 600, are exemplary forms of carrier waves transporting the information.

System 600 can send messages and receive data, including program code, through the network(s), network link 620 and communication interface 618. For example, a server might transmit a requested code for an application program through the Internet, network 622 and communication interface 618. In accordance with the invention, one such downloaded application provides for performing the techniques as described herein.

The received code may be executed by processor 604 as it is received, and/or stored in storage device 610, or other non-volatile storage for later execution. In this manner, system 600 may obtain application code in the form of a carrier wave.

System 600 further includes a controller 650 for controlling at least the printer mechanism 656, which is operable to print in response to print jobs. Controller 650 may be a specialized microprocessor, embedded code, or a processor that executes code stored in memory 606, for example, in response to reception, interpretation and processing of print jobs.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. For example, although the techniques are described in reference to print jobs and printing functionality provided by a printer machine, other clustered machines and associated jobs, such as facsimile machines and facsimile jobs, can be managed using the techniques described herein. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method for printing, the method comprising the computer-implemented steps of:
   transmitting, by a particular printer of a plurality of printers that are configured with a same virtual network address, a signal to said virtual network address;
   at the particular printer:
     if said signal is acknowledged, then assuming a role as a slave printer by said particular printer;
     if said signal is not acknowledged and one or more other printers of said plurality of printers are active on said network, then negotiating with said one or more other printers to determine which one of said plurality of printers should assume a role as a first printer; and if said signal is not acknowledged and no other printers of said plurality of printers are active on said network, then the particular printer assuming the role as said first printer;

receiving, at said first printer of said plurality of printers, a print job request that is addressed to said virtual network address, wherein said virtual network address is bound to said first printer in a manner such that print job requests addressed to said virtual network address are received only by the first printer; and sending, by said first printer, the print job request to a servicing printer, wherein said servicing printer is a printer in said plurality, of printers.

2. The method of claim 1, further comprising the step of: determining, by said first printer, said servicing printer to which said print job request is sent.

3. The method of claim 2, wherein said step of determining is based on attribute information associated with one or more printers of the plurality of printers.

4. The method of claim 1, further comprising the step of: maintaining, at said first printer, attribute information associated with one or more printers of the plurality of printers.

5. The method of claim 1, further comprising the computer-implemented steps of:

receiving, at said first printer, a second print job request that is addressed to a network address associated only with said first printer of said plurality of printers and that is different than said virtual network address; and processing said second print job request.

6. The method of claim 1, further comprising the step of: receiving, by said first printer at said virtual address, a registration of a printer of said plurality of printers.

7. The method of claim 6, wherein said registration includes attribute information associated with said printer, the method further comprising the step of:

broadcasting said attribute information to one or more printers of said plurality of printers, wherein said attribute information is stored at said one or more printers.

8. The method of claim 1, wherein said servicing printer is the first printer.

9. The method of claim 1, further comprising the step of: based on said negotiating, assuming the role as said first printer by said particular printer.

10. A method of managing a network of two or more printers, the method comprising:

transmitting, by a particular printer of said network of printers, a signal to a virtual network address that is associated with said network of printers;

if said signal is acknowledged, then assuming a role as a slave printer by said particular printer;

if said signal is not acknowledged and one or more other printers of said network of printers are active on said network, then negotiating with said one or more other printers to determine which one of said printers should assume a role as a master printer;

if said signal is not acknowledged and no other printers of said network of printers are active on said network, then the particular printer assuming the role as said master printer; and binding said virtual network address to the printer in said network of printers which assumes the role as said master printer such that print job requests addressed to said virtual network address are received only by the printer in said network of printers which assumes the role as said master printer.

11. The method of claim 10, further comprising the step of: if said particular printer assumes the role as a slave printer, then registering with said master printer.

12. The method of claim 11, wherein said registering includes registering attribute information associated with said particular printer, the method further comprising the step of:

broadcasting, by said master printer, said attribute information to one or more printers of said network of printers.

13. The method of claim 11, further comprising the computer-implemented steps of:

receiving, at said particular printer, a print job request that is addressed to a network address associated only with said particular printer of said network of printers; and processing, at said particular printer, said print job request.

14. The method of claim 10, further comprising the step of: if said particular printer is determined to assume the role as said master printer, then binding, by said particular printer, said virtual network address to a network interface of said particular printer.

15. The method of claim 14, further comprising the computer-implemented steps of:

receiving, at said particular printer, a first print job request that is addressed to a network address associated only with said particular printer of said network of printers; and processing, at said particular printer, said first print job request.

16. The method of claim 15, further comprising the computer-implemented steps of:

receiving, at said particular printer, a second print job request that is addressed to said virtual network address; and sending, by said particular printer, the second print job request to any printer of said network of printers.

17. The method of claim 14, further comprising the computer-implemented steps of:

receiving, at said particular printer, a print job request that is addressed to said virtual network address; and sending, by said particular printer, the print job request to a printer of said network of printers.

18. The method of claim 17, further comprising the step of: determining, by said particular printer, said printer to which said print job request is sent.

19. The method of claim 10, further comprising the step of: binding, by said master printer, said virtual network address to a network interface of said master printer.

20. A computer-readable storage medium carrying one or more sequences of instructions for printing, wherein execution of the one or more sequences of instructions by one or more processors causes the one or more processors to perform the steps of:

transmitting, by a particular printer of a plurality of printers that are configured with a same virtual network address, a signal to said virtual network address;

at the particular printer:

if said signal is acknowledged, then assuming a role as a slave printer by said particular printer;

if said signal is not acknowledged and one or more other printers of said plurality of printers are active on said network, then negotiating with said one or more other printers to determine which one of said plurality of printers should assume a role as a first printer; and if said signal is not acknowledged and no other printers of said plurality of printers are active on said network, then the particular printer assuming the role as said first printer;

receiving, at said first printer of said plurality of printers, a print job request that is addressed to said virtual network address,
wherein said virtual network address is bound to said first printer in a manner such that print job requests addressed to said virtual network address are received only by the first printer; and sending, by said first printer, the print job request to a servicing printer, wherein said servicing printer is a printer in said plurality of printers.

21. The computer-readable storage medium of claim 20, wherein the instructions cause the processors to perform the step of:
determining, by said first printer, said servicing printer to which said print job request is sent.

22. The computer-readable storage medium of claim 21, wherein said step of determining is based on attribute information associated with one or more printers of the plurality of printers.

23. The computer-readable storage medium of claim 20, wherein the instructions cause the processors to perform the step of:
maintaining, at said first printer, attribute information associated with one or more printers of the plurality of printers.

24. The computer-readable storage medium of claim 20, wherein the instructions cause the processors to perform the steps of:
receiving, at said first printer, a second print job request that is addressed to a network address associated only with said first printer of said plurality of printers and that is different than said virtual network address; and
processing said second print job request.

25. The computer-readable storage medium of claim 20, wherein the instructions cause the processors to perform the step of:
receiving, by said first printer at said virtual address, a registration of a printer of said plurality of printers.

26. The computer-readable storage medium of claim 25, wherein said registration includes attribute information associated with said printer, and wherein the instructions cause the processors to perform the step of:
broadcasting said attribute information to one or more printers of said plurality of printers, wherein said attribute information is stored at said one or more printers.

27. The computer-readable storage medium of claim 20, wherein said servicing printer is the first printer.

28. The computer-readable storage medium of claim 20, wherein the instructions cause the processors to perform the step of:
based on said negotiating, assuming the role as said first printer by said particular printer.

29. A computer-readable storage medium carrying one or more sequences of instructions for managing a network of two or more printers, wherein execution of the one or more sequences of instructions by one or more processors causes the one or more processors to perform the steps of:
transmitting, by a particular printer of said network of printers, a signal to a virtual network address that is associated with said network of printers;
if said signal is acknowledged, then assuming a role as a slave printer by said particular printer;
if said signal is not acknowledged and one or more other printers of said network of printers are active on said network, then negotiating with said one or more other printers to determine which one of said printers should assume a role as a master printer;
if said signal is not acknowledged and no other printers of said network of printers are active on said network, then the particular printer assuming the role as said master printer; and
binding said virtual network address to the printer in said network of printers which assumes the role as said master printer such that print job requests addressed to said virtual network address are received only by the printer in said network of printers which assumes the role as said master printer.

30. The computer-readable storage medium of claim 29, wherein the instructions cause the processors to perform the step of:
if said particular printer assumes the role as a slave printer, then registering with said master printer.

31. The computer-readable storage medium of claim 30, wherein said registering includes registering attribute information associated with said particular printer, and wherein the instructions cause the processors to perform the step of:
broadcasting, by said master printer, said attribute information to one or more printers of said network of printers.

32. The computer-readable storage medium of claim 30, wherein the instructions cause the processors to perform the steps of:
receiving, at said particular printer, a print job request that is addressed to a network address associated only with said particular printer of said network of printers; and
processing, at said particular printer, said print job request.

33. The computer-readable medium of claim 29, wherein the instructions cause the processors to perform the step of:
if said particular printer is determined to assume the role as said master printer, then binding, by said particular printer, said virtual network address to a network interface of said particular printer.

34. The computer-readable storage medium of claim 33, wherein the instructions cause the processors to perform the steps of:
receiving, at said particular printer, a first print job request that is addressed to a network address associated only with said particular printer of said network of printers; and
processing, at said particular printer, said first print job request.

35. The computer-readable storage medium of claim 34, wherein the instructions cause the processors to perform the steps of:
receiving, at said particular printer, a second print job request that is addressed to said virtual network address; and
sending, by said particular printer, the second print job request to any printer of said network of printers.

36. The computer-readable storage medium of claim 33, wherein the instructions cause the processors to perform the steps of:
receiving, at said particular printer, a print job request that is addressed to said virtual network address; and
sending, by said particular printer, the print job request to a printer of said network of printers.

37. The computer-readable storage medium of claim 36, wherein the instructions cause the processors to perform the step of:

determining, by said particular printer, said printer to which said print job request is sent.

38. The computer-readable storage medium of claim 29, wherein the instructions cause the processors to perform the step of:
binding, by said master printer, said virtual network address to a network interface of said master printer.

39. A printing system configured to:
transmit, by a particular printer of a plurality of printers that are configured with a same virtual network address, a signal to said virtual network address;
at the particular printer:
if said signal is acknowledged, then assume a role as a slave printer by said particular printer;
if said signal is not acknowledged and one or more other printers of said plurality of printers are active in said network, then negotiating with said one or more other printers to determine which one of said plurality of printers should assume a role as a first printer; and
if said signal is not acknowledged and no other printers of said plurality of printers are active on said network, then the particular printer assuming the role as said first printer;
receive, at said first printer of said plurality of printers, a print job request that is addressed to said virtual network address,
wherein said virtual network address is bound to said first printer in a manner such that print job requests addressed to said virtual network address are received only by the first printer; and
send, by said first printer, the print job request to a servicing printer, wherein said servicing printer is a printer in said plurality of printers.

40. The system of claim 39, configured to:
determine, by said first printer, said servicing printer to which said print job request is sent.

41. The system of claim 40, configured to determine said servicing printer based on attribute information associated with one or more printers of the plurality of printers.

42. The system of claim 39 configured to:
maintain, at said first printer, attribute information associated with one or more printers of the plurality of printers.

43. The system of claim 39, configured to:
receive, at said first printer, a second print job request that is addressed to a network address associated only with said first printer of said plurality of printers and that is different than said virtual network address; and
process said second print job request.

44. The system of claim 39, configured to:
receive, by said first printer at said virtual network address, a registration of a printer of said plurality of printers.

45. The system of claim 44, wherein said registration includes attribute information associated with said particular printer, the system configured to:
broadcast said attribute information to one or more printers of said plurality of printers, wherein said attribute information is stored at said one or more printers.

46. The system of claim 39, wherein said servicing printer is the first printer.

47. The system of claim 39, configured to:
based on said negotiating, assume the role as said first printer by said particular printer.

48. A printing system configured to:
transmit, by a particular printer of a network of printers, a signal to a virtual network address that is associated with said network of printers;
if said signal is acknowledged, then assume a role as a slave printer by said particular printer;
if said signal is not acknowledged and one or more other printers of said network of printers are active on said network, then negotiate with said one or more other printers to determine which one of said printers should assume a role as a master printer;
if said signal is not acknowledged and no other printers of said network of printers are active on said network, then the particular printer assuming the role as said master printer; and
binding said virtual network address to the printer in said network of printers which assumes the role as said master printer such that print job requests addressed to said virtual network address are received only by the printer in said network of printers which assumes the role as said master printer.

49. The system of claim 48, configured to:
if said particular printer assumes the role as a slave printer, then register with said master printer.

50. The system of claim 49, wherein said registering includes registering attribute information associated with said particular printer, the system configured to:
broadcast, by said master printer, said attribute information to one or more printers of said network of printers.

51. The system of claim 49, configured to:
receive, at said particular printer, a print job request that is addressed to a network address associated only with said particular printer of said network of printers; and
process, at said particular printer, said print job request.

52. The system of claim 48, configured to:
if said particular printer is determined to assume the role as said master printer, then bind, by said particular printer, said virtual network address to a network interface of said particular printer.

53. The system of claim 52, configured to:
receive, at said particular printer, a first print job request that is addressed to a network address associated only with said particular printer of said network of printers; and
process, at said particular printer, said first print job request.

54. The system of claim 53, configured to:
receive, at said particular printer, a second print job request that is addressed to said virtual network address; and
send, by said particular printer, the second print job request to any printer of said network of printers.

55. The system of claim 52, configured to:
receive, at said particular printer, a print job request that is addressed to said virtual network address; and
send, by said particular printer, the print job request to a printer of said network of printers.

56. The system of claim 55 configured to:
determine, by said particular printer, said printer to which said print job request is sent.

57. The system of claim 48, configured to:
bind, by said master printer, said virtual network address to a network interface of said master printer.

* * * * *

UNITED STATES PATENT AND TRADEMARK OFFICE
CERTIFICATE OF CORRECTION

PATENT NO. : 7,468,804 B2  
APPLICATION NO. : 10/461197  
DATED : December 23, 2008  
INVENTOR(S) : Ke Wei It is certified that error appears in the above-identified patent and that said Letters Patent is hereby corrected as shown below:

Claim 1 - Column 11, Line 16:

Replace: "printer in said plurality, of printers."  
    With: "printer in said plurality of printers."

Claim 42 - Column 15, Line 41:

Replace: "The system of claim 39 configured to:"  
    With: "The system of claim 39, configured to:"

Claim 45 - Column 15, Line 54:

Replace: "includes attribute information associated with said particular"  
    With: "includes attribute information associated with said"

Claim 56 - Column 16, Line 57:

Replace: "The system of claim 55 configured to:"  
    With: "The system of claim 55, configured to:"

Signed and Sealed this

Second Day of June, 2009

JOHN DOLL  
*Acting Director of the United States Patent and Trademark Office*